United States Patent [19]
Chen et al.

[11] Patent Number: 5,499,139
[45] Date of Patent: Mar. 12, 1996

[54] ULTRA-WIDE FIELD OF VIEW, BROAD SPECTRAL BAND HELMET VISOR DISPLAY OPTICAL SYSTEM

[75] Inventors: Chungte W. Chen, Irvine, Calif.; Kris E. Bentley, Dallas, Tex.

[73] Assignee: Hughes Aircraft Company, Los Angeles, Calif.

[21] Appl. No.: 130,471

[22] Filed: Oct. 1, 1993

[51] Int. Cl.$^6$ .................................................. G02B 3/00
[52] U.S. Cl. .......................... 359/649; 359/364; 359/637; 359/557
[58] Field of Search ................. 359/364, 13, 14, 359/637, 638, 649, 827, 554, 557

[56] References Cited

U.S. PATENT DOCUMENTS

| | | |
|---|---|---|
| 3,940,204 | 2/1976 | Withrington . |
| 4,854,688 | 8/1989 | Hayford . |
| 5,004,331 | 4/1991 | Haseltine et al. ............. 359/364 |
| 5,249,079 | 9/1993 | Umeda ........................... 359/554 |
| 5,257,094 | 10/1993 | LaRussa ........................ 359/14 |
| 5,323,263 | 6/1994 | Schoenmakers ............... 359/364 |

FOREIGN PATENT DOCUMENTS

| | | | |
|---|---|---|---|
| 0007039 | 1/1980 | European Pat. Off. | ............... 359/630 |
| 0479439 | 4/1992 | European Pat. Off. . | |
| 8805553 | 7/1988 | WIPO . | |

Primary Examiner—Georgia Y. Epps
Assistant Examiner—Thomas Robbins
Attorney, Agent, or Firm—W. K. Denson-Low

[57] ABSTRACT

An optical display system in which an image is projected onto a combiner surface at a significant bending angle effectively compensates asymmetric aberrations, including quadratic, linear and constant binodal astigmatism components and both linear and constant coma components. Forward and rear optical lens relay groups are positioned between an image generator and the combiner surface. The two relay groups are independently decentered and angularly tilted to increase the degrees of freedom available for aberration compensation. The lenses included in the two relay groups are also designed to compensate for chromatic aberrations, thus allowing for the use of a broad bandwidth combiner and an operating bandwidth that encompasses substantially the full visible spectrum. The reduction in aberrations makes possible a significant increase in the system's field of view.

33 Claims, 3 Drawing Sheets

| LENS SURFACE | CURVATURE RADIUS (cm) | THICKNESS (cm) | MEDIUM |
|---|---|---|---|
| 24f | -3.84400 | -0.400000 | 796.506 |
| 24r / 26f | -3.09000 | -0.100000 | 798.280 |
| 26r | -13.1050 | -0.406480 | AIR |
| 28f | -2.31600 | -0.379227 | 796.506 |
| 28r / 30f | -0.00000 | -1.650000 | 798.280 |
| 30r | -3.84400 | -0.040000 | AIR |
| 32f | -1.15000 | -0.200000 | 796.506 |
| 32r | -1.96400 | -0.141302 | AIR |
| 34f | -1.59640 | -0.100000 | 798.280 |
| 34r | -4.90900 | -0.005000 | AIR |
| 40f | -2.29400 | -0.280000 | 796.506 |
| 40r | -3.76600 | -0.010000 | AIR |
| 36f | -1221200 | -0.500000 | 796.506 |
| 36r / 38f | 1.23530 | -0.045000 | 796.280 |
| 36r | -9.23400 | -0.099172 | AIR |
| WEDGE f | -0.00000 | -0.155498 | 532.817 |

FIG. 5.

ULTRA-WIDE FIELD OF VIEW, BROAD SPECTRAL BAND HELMET VISOR DISPLAY OPTICAL SYSTEM

BACKGROUND OF THE INVENTION

1. Field of the Invention

This invention relates to optical display systems in which an image is reflected off a surface at a large bending angle, producing asymmetric aberrations in the reflected image, and more particularly to the use of such systems for helmet mounted visor displays that include optical systems to compensate the aberrations.

2. Description of the Related Art

Aircraft helmet visor display systems project images that provide necessary pilot information onto the helmet visor immediately in front of the pilot's eyes, allowing the pilot to see both the image reflected from the visor, and the outside scene, in a "heads up" mode. A typical helmet visor display system is described in U.S. Pat. No. 3,940,204, issued Feb. 24, 1976 to Withrington and assigned to Hughes Aircraft Company, the assignee of the present invention. The information image is provided from a cathode ray tube (CRT) mounted on the side of the helmet. The image is directed generally forward, and then deflected by a prism assembly onto the curved visor. To avoid obstructing the image with any part of the helmet or the pilot's head, the image is directed onto the visor at a substantial "bending angle" to a perpendicular from the center of the visor; the bending angle is typically about 55°–60°. This results in significant asymmetrical aberrations in the reflected image.

The aberrations produced with this asymmetrical system are quite complicated, and consist mainly of binodal astigmations and coma. In the past, a relay lens group has been introduced between the CRT and the visor, with the relay group tilted and decentered in an effort to produce equal and opposite aberrations and thus balance out (compensate) the aberrations that result from the asymmetries. The tilt angle of the CRT was also adjusted for this purpose. In addition, the inner surface of the visor (also referred to as a "combiner" since it combines both the projected information from the CRT and the outside scene) was implemented as a holographic surface upon which an asymmetric wavefront had been recorded to further reduce aberrations. The use of the relay group allowed the CRT to be kept small, while the combiner relayed the pupil of the wearer's eye to a location inside the relay group, thus allowing for a small size relay group. The efforts to reduce aberrations have not been wholly successful, however, and a significant residual aberration remained.

Astigmatism and coma are two significant aberrations which limit the image quality of many optical systems. For a symmetric optical system such as a camera lens, the astigmatism is quadradically proportional to the field of view, and coma is linearly proportional to the field of view. Therefore, at the center of the field, astigmatism and coma are zero. For an asymmetric optical system such as a high bending angle helmet visor display (HVD), the astigmatism and coma generated by the visor are much more complicated than that of a symmetric system. Astigmatism is generally characterized as having components that vary quadradically and linearly with the field of view, and also a constant component.

Therefore, there are generally two field points having zero astigmatism, which is different from a single field point of zero astigmatism for the symmetric optical systems. The term binodal astigmatism is used to characterize the two zero astigmatism field points. Coma for the asymmetric optical system includes a linear coma component that varies linearly with the field of view, and constant coma component that is constant over the field of view.

These various aberrations have either not been appreciated in the design of past compensation systems, or the systems were incapable of compensating all of them. In any event, past systems have attempted to eliminate only quadratic astigmatism, constant astigmatism and linear coma. This has resulted in an HVD with a small field of view, residual aberrations, small pupil sizes and limited image resolution.

Another approach has been to reduce the effective bending angle, and thereby eliminate the generation of asymmetric aberrations in the first place. This has been implemented by positioning a beam splitter directly in front of the wearer's eye to redirect the beam from the CRT, and thereby achieve a smaller bending angle and a wider field of view. A major problem with this approach is that it positions a distracting element very close to the wearer's eye, typically less than one-half inch away, and also obstructs the use of eyeglasses.

Another limitation of the prior approach is that holographic combiners have narrow bandwidths, typically restricting the system to a single color. This was not a particular problem with prior CRTs, which also had narrow bandwidths. However, more recent CRTs have a wider bandwidth, but the bandwidth of the overall system is limited to that of its narrowest bandwidth element, i.e., the holographic combiner. If the bandwidth limitation of the prior systems is removed by replacing the holographic combiner with a more conventional visor, however, both additional asymmetric aberrations and chromatic aberrations would result.

SUMMARY OF THE INVENTION

The present invention seeks to provide an improved optical display system for use with a helmet visor or similar large bending angle application that provides a wide field of view and broad bandwidth, and yet exhibits a low level of optical aberrations.

These goals are accomplished by providing two optical lens relay groups, a forward group and a rear group, and decentering and/or tilting each group independent of the other to generate a binodal astigmatism and both linear and constant coma that match and compensate for the visor aberrations with a large bending angle. The provision of two separate relay groups significantly increases the degrees of freedom available for the compensation process, and allows for the compensation of all three binodal astigmatism components and both coma components.

In a preferred embodiment, the front relay group has a net positive focusing that focuses an image of the helmet wearer's eye pupil to a location near the front end of the rear relay group; this allows for a reduction in size of the rear relay group. The rear group also has a net positive optical power and collimates an image from the image generator to near collimation, thereby providing an apparent far field image to the wearer. The rear group functions as a biocular eyepiece with a large numerical aperture.

A non-holographic reflecting surface is used for the visor, expanding its bandwidth to encompass substantially the full visible spectrum. To compensate for resulting chromatic aberrations, lens doublets are used in both the front and rear relay groups, with both groups producing a net positive focusing. The rear group preferably includes a positive focusing lens between two sets of lens doublets. The front lens of the rear group also preferably has a positive optical power to further reduce the size of the relay and enlarge the pupil image size. An optical wedge is positioned between the image generator and the rear relay group to compensate for residual constant coma, with the misalignment between the front and rear relay groups selected to also compensate for chromatic aberrations introduced by the wedge.

These and other features and advantages of the invention will be apparent to those skilled in the art from the following detailed description, taken together with the accompanying drawings.

BRIEF DESCRIPTION OF THE DRAWINGS

FIG. 5 is a table setting forth a lens prescription for a particular implementation of the invention.

DETAILED DESCRIPTION OF THE INVENTION

The invention will be described herein in terms of a heads up helmet display for pilot use. However, it should be recognized that the invention has numerous other applications in which an image is to be presented at a significant bending angle to a display surface located immediately in front of a viewer. Such applications include, for example, "virtual reality" devices, and instruments used to assist with the design or analysis of complicated structures such as DNA investigation or architectural designs.

Figure 1:
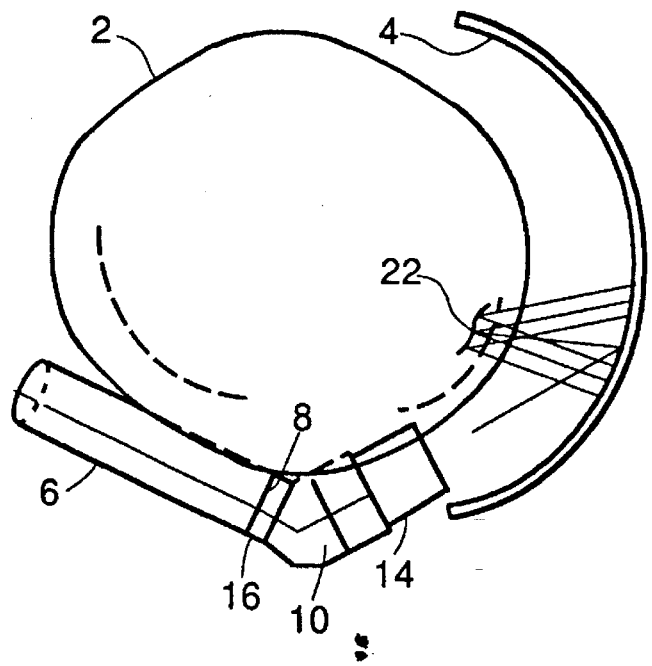
FIG. 1 is a top plan view of a helmet mounted with an optical display system in accordance with the invention.
Figure 2:
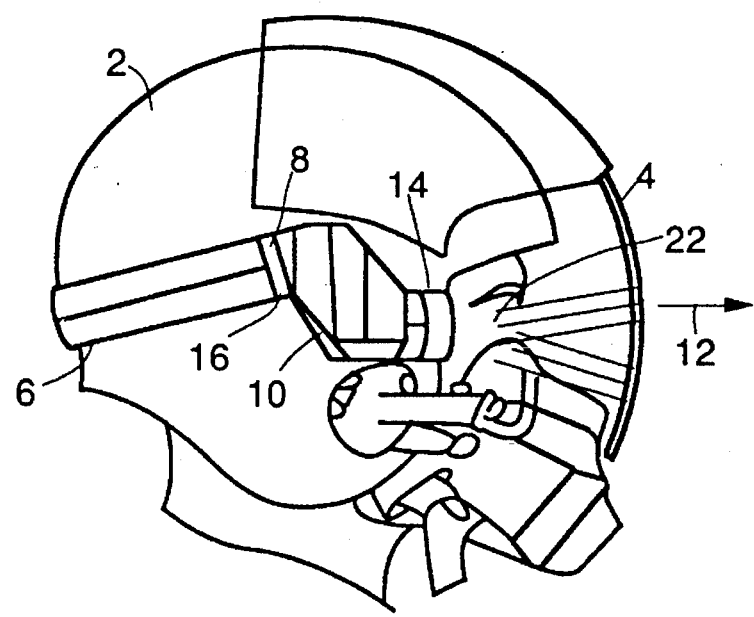
FIG. 2 is a front elevation view of the helmet shown in FIG. 1.

FIGS. 1 and 2 illustrate the application of the invention to a pilot helmet 2 that includes a visor 4. The inner visor surface facing the wearer serves as an optical combiner. Information images are generated by a CRT 6 that is mounted along the side of the helmet. The image at the CRT screen 8 is preferably redirected by a prism assembly 10 so that it points towards the visor, generally in front of the viewer's eyes. The wearer thus has a visible information display on the visor, as well as a clear view of the outside scene as indicated by arrow 12. The use of a prism assembly allows for better packaging of the optical components on the helmet.

A pair of optical lens relay groups, consisting of a forward relay group 14 and a rear relay group 16, are mounted to the helmet in the optical path 18 between the CRT screen 8 and the visor. The rear relay group 16 is generally located between the CRT 6 and the prism assembly 10, although for some applications it may be placed immediately to the rear of the front relay group 14, with the prism assembly 10 located between it and the CRT. The optical components are shown in block diagram format in FIGS. 1 and 2, and additional elements of the optical system are not depicted in these figures. A more complete description of the optical system is provided below in connection with FIGS. 3 and 4.

Rather than bearing a hologram as in prior systems, the inner surface of visor 4 is a conventional reflective combiner, with a pertzval curvature that balances that of the relay groups. A see-through capability is provided for the combiner by applying a beam splitter type coating to it. This use of a non-holographic combiner, which has a broad bandwidth encompassing substantially the full visible spectrum, allows for the use of a CRT 6 with a similarly broadband output. Chromatic aberrations that result from this broadband operation are compensated by the design of the relay groups 14, 16, as described below.

The principal ray 18 of the center field of view from the CRT 6 to the visor 4 is defined herein as the optical axis. It has an angle of incidence θ to the visor that is considerably offset from a perpendicular drawn to the visor at that point; the angular difference between the visor perpendicular and the axis 18 is referred to as the system's bending angle. It can be seen that the bending angle varies at different locations on the visor, but in generally it will typically be about 55°–60°. The asymmetric orientation of the visor with respect to the incident beam from CRT 6 results in the complex asymmetrical aberrations mentioned previously.

An important feature of the invention is that the forward and rear relay groups 14, 16 can be oriented independent of each other to provide a significant increase in the degrees of freedom available to compensate for these aberrations. Either or both of the relay groups can be decentered with respect to each other and to the optical axis 18, i.e., shifted somewhat laterally so that the center of the relay group is no long centered on the axis 18. In addition, each relay group can be angularly tilted so that its internal axis is non-parallel to the system axis 18. Since each relay group can be positioned independent of the other, they can be misaligned with respect to each other by mutual decentering and angular tilting.

The visor aberrations will generally have a plane of symmetry that includes the optical axis 18. At any pair of corresponding points above and below the plane, the incident light from the CRT will have traversed an equal distance, and will have the same angle of incidence to the visor. In FIG. 2 the plane of symmetry extends into the page. Since the optical aberrations will generally be symmetrical on opposite sides of this plane, the relay groups 14, 16 need only tilt and decenter in a plane that is generally parallel to the symmetry plane.

The visor 4 and the other elements of the optical system are oriented so that the image from CRT 6 is directed onto the helmet wearer's eye 22. A more detailed description of the system's structure, and of how the optical image from the CRT is provided to the wearer with a substantial reduction in both stigmatic and coma aberrations, is described below in connection with FIGS. 3 and 4.

Figure 3:
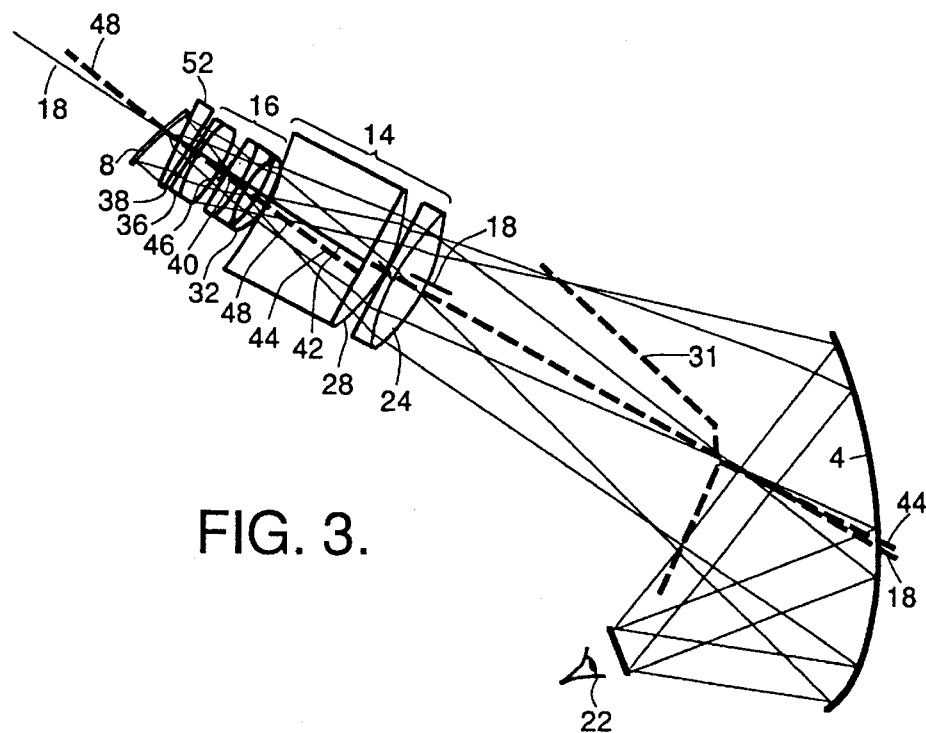
FIG. 3 is a top plan view illustrating the arrangement of the optical elements in a preferred embodiment.
Figure 4:
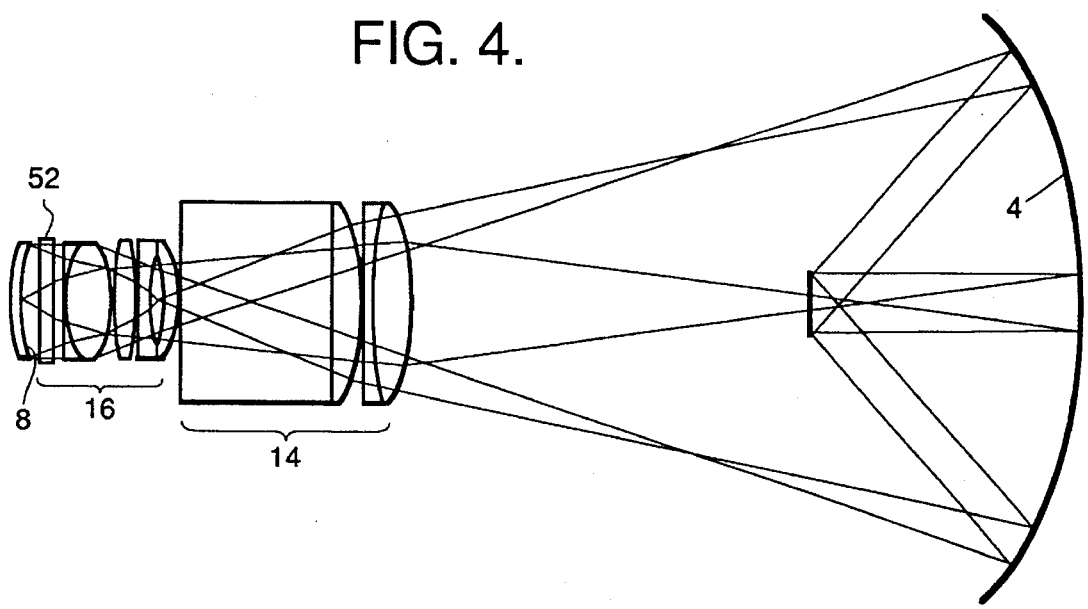
FIG. 4 is a front elevation view of the embodiment shown in FIG. 3.

Referring to FIGS. 3 and 4, a preferred embodiment of the invention is shown. FIG. 3 has a similar orientation to FIG. 1, except the optical elements of FIG. 3 are shown as they would be mounted on the left side of a helmet, rather than the right side as in FIG. 1. The optical system could alternately be located on top of the helmet, in which case the decentering and tilt plane would rotate 90° from the corresponding plane for FIGS. 1 and 3, or at some other convenient location.

The front relay group 14 consists of matched positive and negative lenses 24 and 26, which together comprise a lens doublet that compensates for chromatic aberrations, another positive lens 28, and a thick negative lens 30 between lens 28 and the rear relay group 16. The lens 30 has a slightly curved rear surface, and can also function as the prism assembly 10 of FIGS. 1 and 2 by implementing it with an optical turning angle. Lenses 28 and 30 comprise another lens doublet, with a net positive optical power. The operation of a lens doublet in compensating for chromatic aberrations is described in Smith, *Modern Optical Engineering*, McGraw Hill Book Company, 1966, pages 334–337.

The positive optical power of the front relay group 14 relays an image of the helmet wearer's pupil to a location near the front lens 32 of the rear relay group; this allows the rear relay group 16 to be constructed with a substantially smaller cross-sectional area than the front group. The front relay group 14 together with the visor/combiner 4 function as an afocal telescope, with a collimated input beam resulting in a collimated output beam. It forms an intermediate image of the CRT display at an intermediate image plane 31.

The rear relay group 16 preferably includes a front lens doublet consisting of positive lens 32 and negative lens 34, a rear lens doublet consisting of position lens 36 and negative lens 38, and a positive focusing lens 40 between the front and rear lens doublets. The front doublet has an air space between its two constituent lenses 32, 34; such an arrangement is known to reduce higher order aberrations. The middle positive lens 40 provides the rear relay group with a net positive focusing; a positive focusing for each relay group is necessary to produce a real image. While positive lenses 36 and 40 could be combined into a single lens having a greater surface curvature, this would aggravate the aberrations.

The positive lenses in both relay groups are preferably formed from crown glass, which has a relatively low dispersion and a low refractive index differential for different wavelengths. The negative lenses are preferably formed from flint glass, which is more dispersive and has a larger refractive index differential for different wavelengths.

It has been found that, by independently decentering and angularly tilting the two relay groups 14 and 16, a much higher degree of asymmetrical aberration compensation can be achieved than with past systems. The amount of tilt and decentering for each relay group will depend upon the characteristics of the particular optical system. In FIG. 3, the front relay group 14 is illustrated as having its optical center at point 42, and its optical axis 44 (shown in dashed lines) extending through the center. In the illustrated example, the front relay group 14 is decentered to the right of the system's optical axis 18 (with the respect to a direction of travel from the relay group towards the visor 4). It is also angularly tilted, with its optical axis 44 intersecting the system axis 18 between the front relay group and the visor.

The rear relay group 16 has its optical center at 46, and is also illustrated as being decentered to the right of the system axis 18, but by a different amount. In this example the rear relay group 16 is angularly tilted in the opposite sense to the front relay group, with its optical axis 48 intersecting the system axis 18 to the rear of the relay group 16.

The particular decentering and tilting for each of the relay groups in a given system is preferably determined with the assistance of a computer program. Software packages with this capability are currently available, such as the CODEV® program by Optical Research Associates, Inc. of Pasadena, Calif. The system designer characterizes the optical system under consideration by inputting the radius of curvature and thickness of all lenses, the spacing between and positions of the lenses, the lens materials, the degrees of freedom for the decentering and tilt adjustments, and the characteristics of the visor surface. The program employs an iterative process that adjusts the decentering of the relay groups and their tilt angles slightly, observes how these adjustments impact the image quality, and continues with additional adjustment iterations to optimize the image quality and minimize aberrations.

The front relay group 14 is designed to focus an image from the viewer's eye pupil 22, reflected off the inner surface of visor 4, to a location just forward of the rear relay group 16. This allows the cross-sectional area of the rear relay group to be considerably less than that of the forward group, without any loss of light. The first lens 32 of the rear relay group preferably has a positive optical power, which further reduces the size required for the relay group and enlarges the pupil image. The rear relay group in effect constitutes a biocular eyepiece with a large numerical aperture. It has a net positive optical power that focuses an image from the image generating surface 23 to near collimation, as can be seen from the optical ray traces 50a, 50b from the center of the image generator. This gives a desirable far field effect to the image seen on the visor by the wearer of the helmet.

An optical wedge 52 is positioned between the image generating surface 23 and the rear relay group 16 to remove any residual coma that may be left from the remainder of the optical system. The characteristics of the wedge can also be added as an input to the software program used for the particular system design, with the program determining an optimum wedge tilt angle. The presence of the wedge may introduce a degree of chromatic aberration, but this can be compensated by adjusting the decentering of the front and/or rear relay groups.

With the invention as described, the majority of all three binodal astigmatism components (quadratic, linear and constant), as well as both linear and constant coma, can be effectively compensated, while at the same time significantly increasing the field of view. Fields of view on the order of 60° horizontal×80° vertical are achievable. In addition, the operating bandwidth can be extended to cover substantially the full visible spectrum, without a corresponding degradation in the image quality.

The lens prescription for a particular system that uses the invention is given in FIG. 5. The system employs the lens arrangement shown in FIGS. 3 and 4. The radius of curvature for each lens surface is given in cm, with a positive number indicating a concave curvature as seen from the right hand side of the figure, and a negative number indicating a convex curvature. The thickness, also given in cm, is the thickness from the center of the given lens surface to the center of the next surface to the left. The index of refraction and Abbe number for the medium immediately to the left of the lens surface is defined in the conventional six digit notation, with the index of refraction preceding the Abbe number. All indices of refraction are in the form 1.xyz; the unit value 1 is omitted in FIG. 5 and only the three decimal figures are given. For example, the first entry (796) corresponds to a refractive index of 1.796. All Abbe numbers are in the form of a two digit whole number followed by a single digit decimal (xy.z); the first entry 506 corresponds to an Abbe number 50.6. The front surface of a lens (as seen from the right hand side of the figure) is indicated by the letter f, and the rear surface by the letter r. The visor had a radius of curvature of −12.3444 cm and was spaced 17.1493 cm from lens 24; the image plane 23 had a radius of curvature of 19.3480 cm and was spaced 0.5334 cm behind the wedge 52. The front relay group 14 was not decentered in this particular example, but was tilted 2.665781°. The rear relay group was decentered 0.07353 cm and tilted −6.592328°. The wedge was tilted 9.200121° and the image plane −20.019865°.

While a particular embodiment of the invention has been shown and described, numerous variations and alternate embodiments will occur to those skilled in the art. Accordingly, it is intended that the invention be limited only in terms of the appended claims.

We claim:

1. A wide field of view optical display system, comprising:

an image generator, a reflector having a reflective surface positioned to receive and reflect an image from said image generator, and oriented at a substantial bending angle to said image generator so as to produce asymmetric aberrations in the reflected image, a multi-lens rear optical lens relay group positioned in an optical path between said image generator and said reflector, and a multi-lens front optical lens relay group positioned in said optical path between said rear relay group and said reflector, said front relay group as a whole and said rear relay group as a whole being tilted and/or decentered relative to each other such that all of the lenses in said front relay group are misaligned with respect to all of the lenses in said rear relay group to compensate for said asymmetric aberrations.

2. The optical display system of claim 1, wherein said front and rear relay groups are decentered and angularly tilted with respect to each other and to an optical axis between said image generator and said reflector.

3. The optical display system of claim 1, wherein an image from said image generator reflector is intended to be viewed from a predetermined location with respect to said reflector, said front relay group having a net positive optical power that focuses an image of the viewer's eye to a location near the front end of said rear relay group.

4. The optical display system of claim 3, said front relay group including a thick negative lens adjacent said rear relay group.

5. The optical display system of claim 1, wherein said rear relay group focuses an image from said image generator to near collimation, thereby providing an apparent far field image to the front relay group, and said front relay group together with said reflector function as an afocal telescope.

6. The optical display system of claim 1, wherein said front and rear relay groups both have respective net positive focusings.

7. The optical display system of claim 6, wherein said rear relay group is substantially smaller in cross-sectional area than said front relay group.

8. The optical display system of claim 1, wherein said reflector establishes aberrations in an image from said image generator that are substantially symmetrical about a plane of symmetry, and said front and rear relay groups are misaligned with respect to each other in a plane that is approximately parallel to said plane of symmetry.

9. The optical display system of claim 1, said asymmetric aberrations including a constant coma component, further comprising an optical wedge that is provided between said image generator and said rear relay group, said optical wedge being oriented to compensate for residual constant coma that is not compensated by said front and rear relay groups.

10. The optical display system of claim 9, wherein said front and rear relay groups are misaligned with respect to each other to compensate for chromatic aberrations introduced by said wedge.

11. The optical display system of claim 1, wherein said image generator and reflective surface have bandwidths extending over the full visible spectrum.

12. The optical display system of claim 11, wherein said front and rear relay groups include lens doublets to compensate for chromatic aberrations otherwise imposed by the display system upon an image from said image generator.

13. The optical display system of claim 12, wherein said rear relay group comprises a pair of lens doublets with a positive focusing lens between said pair of lens doublets.

14. The optical display system of claim 12, said rear relay group including a front lens with a positive optical power.

15. The optical display system of claim 14, wherein said reflector has a curvature that provides petzval correction for said relay groups.

16. A helmet visor optical display system, comprising:

a helmet having a curved viewing visor with a viewing surface facing the helmet wearer, an image generator mounted on said helmet and oriented to project an image onto said viewing surface at a substantial bending angle to said surface, said bending angle producing binodal astigmatism with quadratic, linear and constant components, and coma with linear and constant components, in the image reflected from said viewing surface, a multi-lens rear optical lens relay group mounted on said helmet in an optical path between said image generator and said visor, and a multi-lens front optical lens relay group mounted on said helmet in said optical path between said rear relay group and said visor, said front relay group as a whole and said rear relay group as a whole being tilted and/or decentered relative to each other such that all of the lenses in said front relay group are misaligned with respect to all of the lenses in said rear relay group to substantially compensate for said binodal and linear astigmatism.

17. The optical display system of claim 16, wherein said visor viewing surface comprises a non-holographic reflecting surface.

18. The optical display system of claim 16, wherein said front and rear relay groups are decentered and angularly tilted with respect to each other and to an optical axis between said image generator and said visor.

19. The optical display system of claim 18, said front relay group including a thick negative lens adjacent said rear relay group.

20. The optical display system of claim 16, said front relay group having a net positive focusing that focuses an image of the eye pupil of a person wearing the helmet to a location near the front end of said rear relay group.

21. The optical display system of claim 16, wherein said rear relay group focuses an image from said image generator to near collimation, thereby providing an apparent far field image to the front relay group, and said front relay group together with said visor function as an afocal telescope.

22. The optical display system of claim 16, wherein said front and rear relay groups both have respective net positive focusings.

23. The optical display system of claim 22, wherein said rear relay group is substantially smaller in cross-sectional area than said front relay group.

24. The optical display system of claim 16, wherein said visor establishes aberrations in an image from said image generator that are substantially symmetrical about a plane of symmetry, and said front and rear relay groups are misaligned with respect to each other in a plane that is approximately parallel to said plane of symmetry.

25. The optical display system of claim 16, said asymmetric aberrations including a constant coma component, further comprising an optical wedge that is provided between said image generator and said rear relay group, said optical wedge being oriented to compensate for residual constant coma that is not compensated by said front and rear relay groups.

26. The optical display system of claim 25, wherein said front and rear relay groups are misaligned with respect to each other to compensate for chromatic aberrations introduced by said wedge.

27. The optical display system of claim 16, wherein said image generator and visor viewing surface had bandwidths extending substantially over the full visible spectrum.

28. The optical display system of claim 27, wherein said front and rear relay groups include lens doublets to compensate for chromatic aberrations otherwise imposed by the display system upon an image from said image generator.

29. The optical display system of claim 28, wherein said rear relay group comprises a pair of lens doublets with a positive focusing lens between said pair of lens doublets.

30. The optical display system of claim 28, said rear relay group including a front lens with a positive optical power.

31. The optical display system of claim 30, said viewing surface comprising a reflector having a curvature that provides petzval correction for said relay groups.

32. A method of removing asymmetric aberrations from a wide field of view optical display system which includes an image generator, a reflector having a reflective surface positioned to receive and reflect an image from said image generator, said reflector oriented at a substantial bending angle to said image generator so as to produce asymmetric aberrations in the reflected image, a multi-lens rear optical lens relay group positioned along an optical axis between said image generator and said reflector, and a multi-lens front optical lens relay group positioned along said optical axis between said rear relay group and said reflector, comprising:

programming a computer with an optical design computer program, inputting characteristics of the lenses in said relay groups and of said reflective surface into said programmed computer, inputting instructions to said program to tilt and/or decenter all of the lenses in at least one of said relay groups as a whole relative to said axis, running said program to determine a desired tilt and/or decentering to substantially remove said asymmetric aberrations, and tilting and/or decentering at least one of said relay groups as a whole in accordance with said desired tilt and decentering.

33. The method of claim 32, wherein separate desired tilts and decenterings are determined for said front and rear relay groups, and said relay groups are each tilted and decentered as a whole in accordance with their respective desired tilts and decenterings.

* * * * *